Dec. 13, 1938.  G. MALMGREN  2,139,902
MEANS AND METHOD FOR ANALYZING GASES
Filed May 14, 1935  2 Sheets-Sheet 1
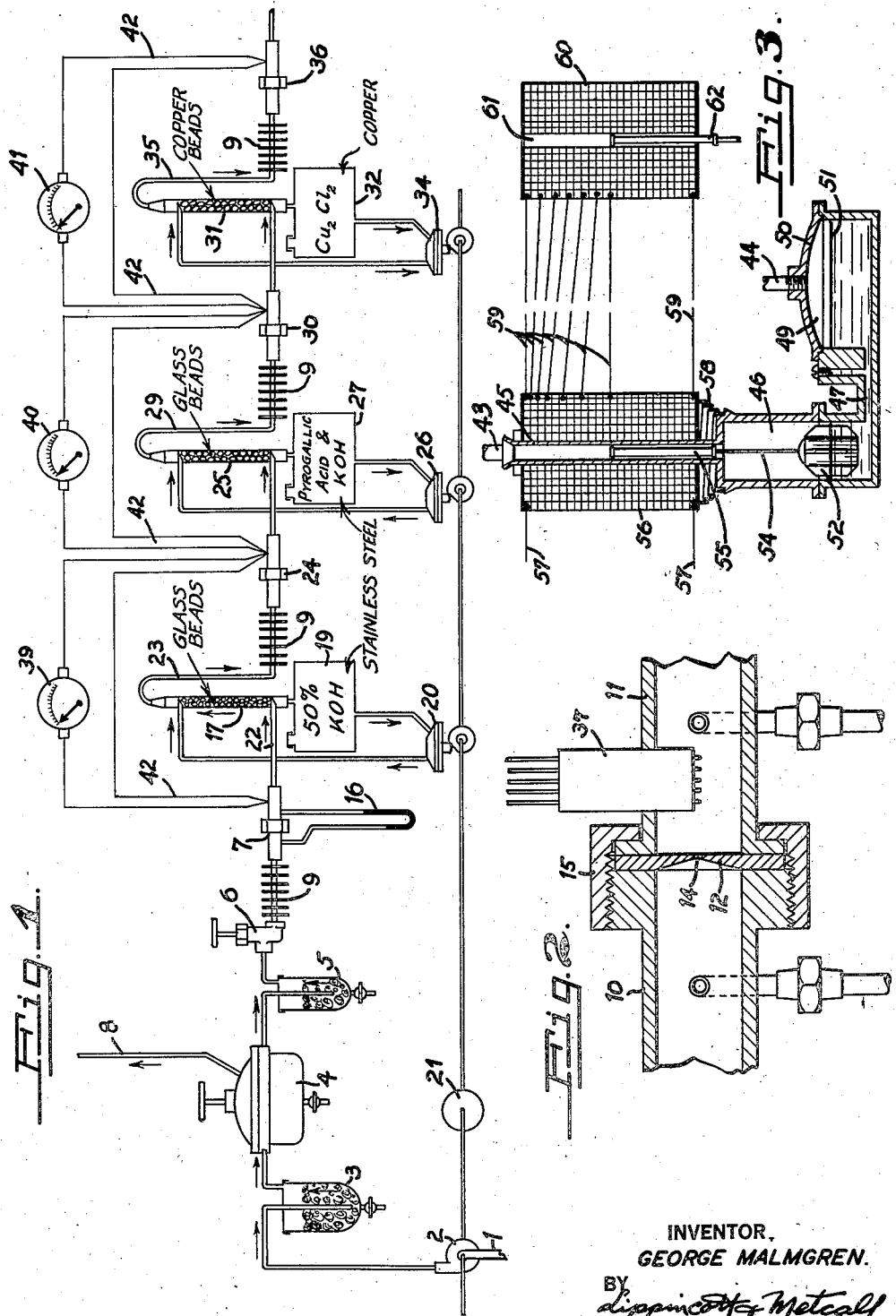
INVENTOR.
GEORGE MALMGREN.
BY
ATTORNEYS

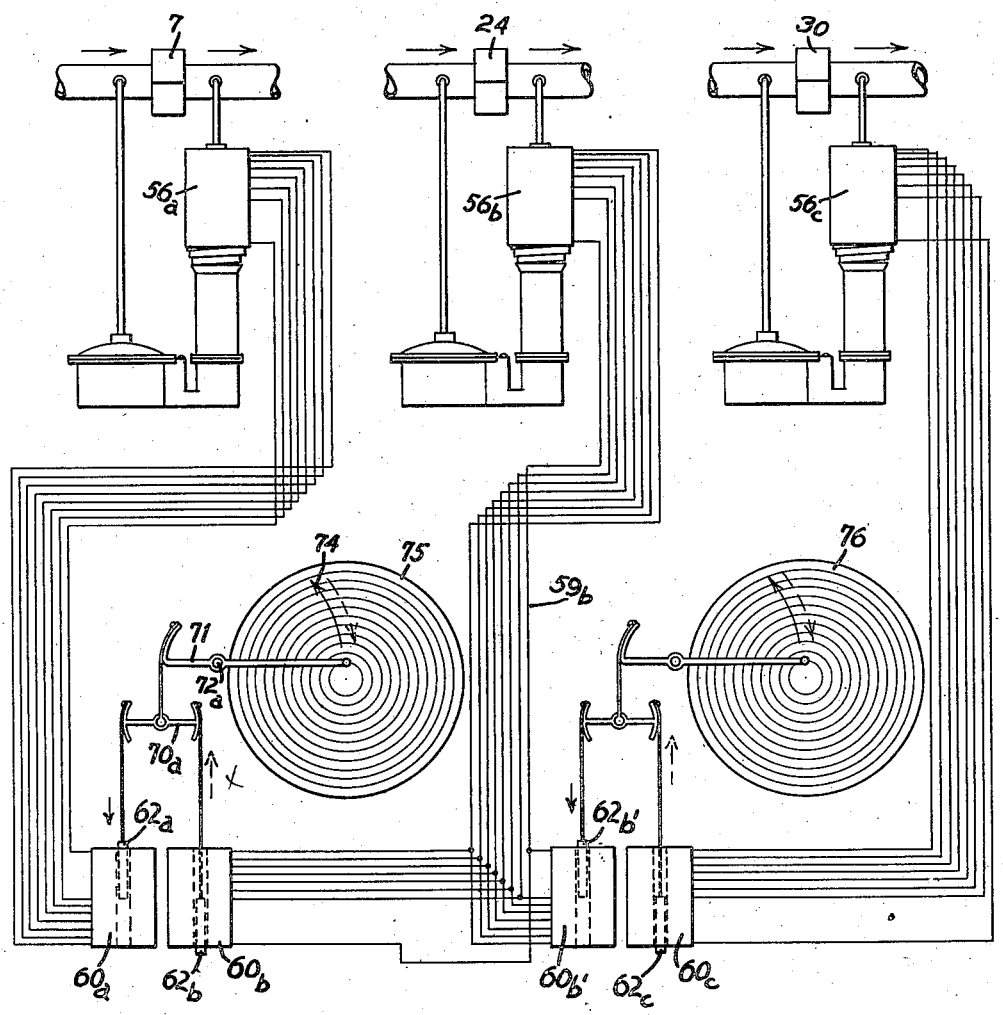

Patented Dec. 13, 1938

2,139,902

UNITED STATES PATENT OFFICE 2,139,902

MEANS AND METHOD FOR ANALYZING GASES

George Malmgren, Santa Cruz, Calif.

Application May 14, 1935, Serial No. 21,442

2 Claims. (Cl. 23—232)

My invention relates to means and method for gas analysis, and more particularly to such a means and method that will allow continuous and automatic analysis of a gaseous flow.

Among the objects of my invention are: To provide an automatic and continuous gas analysis apparatus; to provide a method for automatically and continuously analyzing a gaseous flow; to provide a means and method for using the Joule-Thomson effect in the analysis of gases; to provide gas analysis apparatus utilizing the Joule-Thomson effect to product a recordable impulse representing the decrease in volume due to absorption; to provide a method in gas analysis apparatus of recording continuously the volumes of gaseous components in a gaseous flow; to provide means and method for abstracting from a gaseous flow various components thereof and continuously indicating the volume abstracted; to provide a means and method for abstracting a component from a gaseous flow, together with an electrical means and method for indicating the volume abstracted; to provide an exponential inductance bridge adapted to convert pressure difference readings into volume readings; to provide a manometer reading in terms of volume without interpolation; and to provide a simple means and method for analyzing flue gases.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Referring to the drawings:

Figure 1 is a flow line diagrammatic and reduced to lowest terms, of a preferred embodiment of my invention as applied to the analysis of flue gases, this particular embodiment utilizing the Joule-Thomson effect for indicating the volume of the components of the gases absorbed.

Figure 2 is a view partly in section and partly in elevation of an orifice mounted to produce the Joule-Thomson effect and illustrating a thermocouple positioned adjacent the orifice.

Figure 3 is a view in longitudinal section of an inductance bridge giving an exponential reading, operated by pressure and responding in a movement of which the volume is a straight-line function.

Figure 4 is a diagrammatic representation of the three orifices and their mountings as used in the flow line of Figure 1, with pressure-actuated inductance bridges mounted thereon and connected to charts directly reading in per cent of the various components.

The broad aspects of my invention may be more clearly understood by direct reference to the preferred set-up shown in the drawings. Figure 1 is a set-up for the analysis of a gas containing carbon dioxide ($CO_2$), oxygen ($O_2$) and carbon monoxide ($CO$). Other components, if present, may be analyzed also in the same flow if desired, by adding orifices and absorption towers having the proper chemicals circulating therein. The main flow enters intake pipe 1 and passes to a pump 2 which discharges into a filter 3, the flow thence passing through a pressure relief valve 4 having in its output a secondary filter 5. Part of the gas sample taken is discharged from the secondary filter 5 to a needle valve 6 which regulates the flow into an orifice chamber 7 shown in detail in Figure 2, the excess gas being expelled through pipe 8. I prefer to equip the pipe entering the orifice chamber 7 with fins 9 and as a plurality of orfice chambers are used throughout the line, the entering pipe of each will be equipped with similar fins, the purpose of the fins being to give the gas sample entering the several orifice chambers the same temperature that prevails within the room.

Orifice chamber 7 comprises an inlet member 10 and an outlet member 11 made in the form of a union having clamped therebetween an orifice plate 12 having a central orifice 14. The orifice plate and the two portions of the orifice chamber are held together by a union nut 15.

A water manometer 16 is positioned across the orifice, and by viewing the manometer and regulating the flow by means of needle valve 6, the apparatus can be adjusted for the proper size of gas sample.

The flow then passes into a $CO_2$ absorption tower 17 filled with glass beads and having circulating therethrough a solution of fifty per cent potassium hydroxide ($KOH$) from a reservoir 19 by means of a cam-driven pump 20 operated by motor 21, which also drives the pump 2 and other cam-driven pumps, as will be later referred to. The flow enters the bottom of the tower through pipe 22 and passes out of the top of the tower through pipe 23 and thence enters another orifice chamber 24 similar in all respects to the one previously described, except for the fact that no manometer is used in this location.

The flow then passes through a second absorption tower 25 supplied with a solution of pyrogallic acid ($C_6H_3(OH)_3$) in 50% $KOH$ solution, circulated therethough by means of another pump 26 from a container 27. This tower also contains glass beads. For purposes of reducing corrosion by the solution, I prefer to make both containers 19 and 27 from stainless steel.

From the second absorption tower, the flow passes through pipe 29 into a third orifice chamber 30 and from thence into a third absorption tower 31 containing copper beads and having a solution of cuprous chloride ($Cu_2Cl_2$) circulating therethrough from a copper container 32 by a third cam pump 34. The outlet of this third absorption tower passes through pipe 35 into a fourth orifice chamber 36 and from thence to other absorption towers if it is desired to analyze the gas further, the number of stages shown so far being deemed sufficient to show the operation of the flow line. It will thus be seen that $CO_2$ will be absorbed in tower 17, $O_2$ will be absorbed in tower 25, and CO will be absorbed in tower 31.

Returning to the tower 17 together with its associated orifice chambers 7 and 24, it will be seen that as the $CO_2$ contained in the gas supply is absorbed in the tower, the gas volume passing through the orifice in orifice chamber 24 is less than that going through the orifice in chamber 7, the decrease being the amount of gas absorbed in tower 17. This decrease in volume makes the velocity of the gas on the outlet side of orifice chamber 24 less than in the same location in orifice chamber 7.

Temperatures of the inlet sides of all the chambers 7 and 24 are identical due to the heat exchange in the towers and the fins 9 reducing the inlet sides to room or apparatus temperatures and the same reasoning will hold for the inlet sides of any of the other orifice chambers as related to any of the others.

The temperatures, however, due to the Joule-Thomson effect and the absorption of gases in the towers will not be the same on the outlet sides of the various orifices and if the temperature difference between each succeeding outlet can be recorded, the difference will be a very close approximation to a straight-line function of the volume of gas absorbed in the intermediate tower. One of the main features of my invention is, therefore, the means and method by which this volume difference may be read, and preferably recorded.

There are several ways by which the volume absorbed by the towers may be measured and recorded directly and the first method which I wish to describe is that which makes use of the temperature difference between successive orifice chambers in the outlet side of the orifices 14.

One preferred method of measuring the difference in temperature is shown in Figures 1 and 2 where thermocouples 37 are placed in the outlet side of the orifice chambers 7, 24, 30 and 36. In order to compare the temperatures of the outlet sides of the intermediate orifice chambers 24 and 30, I prefer to insert double thermocouples in these locations.

I next connect the thermocouple in the orifice chamber 7 in series with a thermocouple in orifice chamber 24 and read the potential created by the temperature difference by means of a millivoltmeter 39. I then connect the other thermocouple in orifice chamber 24 in series with a thermocouple in orifice chamber 30 and read the output in the millivoltmeter 40 and finally place the remaining thermocouple in orifice chamber 30 in series with the thermocouple in orifice chamber 36 and read the output in millivoltmeter 41. Thus, I am able to read directly the difference in temperature between the outlet sides of orifice chambers 7 and 24, orifice chambers 24 and 30, orifice chambers 30 and 36, each of these circuits bridging an absorption tower. The thermocouples, being connected in series with the proper line wires 42 will effectively have, as is well known in the art, their cold junction in the orifice chamber nearest the beginning of flow and their hot junction in the next succeeding orifice chamber.

In computing the response of the millivoltmeters 39, 40 and 41 to the temperature differences between succeeding orifice outlets and comparing it with a curve showing a calculated temperature drop in a gas flow through an orifice, utilizing the Joule-Thomson effect, I find that the reading of the millivoltmeters is practically identical with the calculations over the first twenty-five per cent reduction in volume. Inasmuch as practically no gases have more than twenty-five per cent absorption in any one tower, the readings I obtain are commercially accurate for all practical purposes. While I have shown millivoltmeters 39, 40 and 41 as visually indicating devices, it is quite preferable in many cases to have them recording millivoltmeters recording directly on clock driven charts in per cent of the respective constituents absorbed by the tower bridged.

It is quite obvious that in analyzing the conditions which obtain in the flow line such as shown in Figure 1 that there will be a difference in pressure in each orifice chamber on each side of the orifice and that these differences in pressure will differ on each side of any particular tower. I may prefer, therefore, in some instances to measure the difference in volume absorbed by the towers as a function of the difference of pressures developed on each side of the orifice as compared to the pressures developed in immediately prior or immediately subsequent orifice chambers, and I obtain direct readings on a chart in percentage volume absorption by utilizing an exponential inductance bridge operated by pressure but reading in volume. This inductance bridge is shown in Figure 3 and the recording system shown in Figure 4.

The inductance bridge itself comprises a low pressure connection 43 and a high pressure connection 44, these connections being made, for example, to orifice chamber 7 in exactly the same manner as manometer 16 is attached thereto and I desire to place a separate bridge around each orifice by attaching the connections of other and like bridges to orifice chambers 24, 30 and 36.

The low pressure inlet 43 extends through a non-magnetic core cylinder 45 into a float chamber 46, the bottom of the float chamber being connected by a conduit 47 to the high pressure chamber 49, the latter being closed to the atmosphere by a cap 50 carrying the high pressure pipe 44. The pressure chambers 49 and 46 are filled with liquid, preferably water, up to the level 51, thus causing flotation of a float 52 in float chamber 46. The float 52 carries an upward extension 54 which in turn carries a soft iron core 55, positioned within the core cylinder 45, the assembly being movable vertically within the float chamber and core cylinder.

Wound around the core cylinder 45 is an inductance assembly 56 having leads 57 at each end thereof whereby alternating current may be supplied to the complete inductance, the complete coil being supported on spring 58. Inductance 56 is wound with a number of taps to segregate the upper half of the coil into a number of different parts, each part being wound to occupy a progressively smaller space as the coil approaches the upper end, but each part also being wound to have the same inductance. Taps 59 are taken from the upper half of the inductance and also from the lower end and are led to a recording inductance 60, the upper and lower leads passing directly to the upper and lower ends of the inductance 60 and the intermediate taps passing to both physically and electrically identical parts of inductance 60 segregated in the upper half thereof, each part in this case being of the same inductance as the corresponding part in inductance 56, but differing from coil 56 in that the inductance of each related part occupies the same space in the recording coil.

Inductance 60 is also provided with an axial core way 61 in which an iron core 62 is adapted to be moved to cause a record to be made, as will be later explained, by the apparatus and hookup shown in Figure 4.

It is well known that in the general type of inductance bridge shown, if the corresponding portions of the two coils occupy the same space and have the same inductance, the core 62 will follow the movements of core 55. In this case, however, due to the exponential arrangement of the tapped portions 59 on coil 56 the motion and travel of core 62 will have a practically exponential relation to the motion of the core 55 and in this particular case I have arranged the coils so that when core 55 is operated by pressure exerted on the liquid by high pressure in chamber 49, the motion of core 62 will be such that it can be recorded directly in terms of volume, the latter being a straight-line function of the movement of core 62. While I have chosen this particular arrangement of coils, it is obvious that other arrangements may be made in order to obtain other exponentially related motions of the cores.

The general equation may be given as follows for the two coils:

$$\text{Coil 56} \quad h_n' = \left(\frac{n}{N}\right)^m \times H'$$

and $$\text{coil 60} \quad h_n'' = \frac{n}{N} \times H''$$

where $H'$ is the height of the upper half of coil 56 and $H''$ is the height of the upper half of coil 60. $h_n'$ is the height of $n$ coils in coil 56 and $h_n''$ is the height of the same number of coils in coil 60. $N =$ the total number of coils in upper half of the coils 56 and 60. In this case, exponent $m$ equals one-half. In deriving the equation, the lower half of coil 56 is designated $H_o'$ and the lower half of coil 60 is designated as $H_o''$. ($H_o' = H'$; $H_o'' = H''$.)

Having now described the inductance bridge which may be attached to each orifice chamber, I wish to show how the cores 62 may be utilized to create a record reading directly in volume difference, or per cent volume, as in the apparatus of Figure 4. Here, primary coil 56a is attached to the secondary coil 60a, with coil 60a in a position where the tapped portion of the inductance is below. In the next bridge primary inductance 56b is connected to secondary inductance 60b with the position of the inductance 60b reversed so the tapped portion of the inductance is above and leads 59b are also attached to secondary inductance 60b' which is positioned as was 60a with the tapped portion of the inductance below. Primary coil 56c is connected to secondary coil 60c which is again reversed with the tapped portion above. Thus, coils 60a and 60b, one reversed and the other upright, are associated together, and coils 60b' and 60c are associated in reversed relationship. Cores 62a and 62b are hung on a rotating pivot 70a, the center of the pivot hanging from a recording lever 71 fastened to a fixed pivot 72a and extending beyond the pivot to a recording tip traversing an arc 74 on a rotating chart 75. Similarly, cores 62b' and 62c are attached to identically similar mechanism to cause a recording tip to pass over a rotating chart 76.

It is of course to be understood that the cores 62a, 62b, 62b' and 62c are suspended on nonmagnetic chains to the constant lever balances. As the coils 56a and 56b, for example, considering only the chart 75, are connected to an alternating current supply such as the 110 volt mains, for example, the characteristic of the magnetic field and the subsequent potentials on the various taps are governed by the position of their associated cores which in turn are varied in position by the difference in pressure on each side of the orifices in orifice chambers 7 and 24. Through the connections between the taps on coils 56a and 60a and coils 56b and 60b, currents are flowing in such a manner that the magnetic field characteristic in coils 60a and coils 60b causes a motion of the cores 62a and 62b, the difference of which is proportional to the volume of gas absorbed by tower 17.

Due to the reversed positions of coils 60a and 60b, the volume movement of core 62b is subtracted directly from the volume movement of core 62a and the resulting movement of the center of the balance is proportional to the volume of gas absorbed in the tower. This movement is then transferred to the chart by means of lever 71 where it is recorded in per cent of the total gas passing through orifice assembly 7. The action of chart 76 and its associated recording mechanism is identical where three towers are used. Three charts may be used to record directly the volume absorbed by each tower. In practice, however, it is preferable to record all components on one and the same chart.

While I have described my apparatus and method as applied to the analysis of flue gases, it will be apparent to those skilled in the art that other gas flows may be analyzed, utilizing absorbents suitable to the various constituents of the flow.

I claim:

1. The method of analyzing a gas flow which comprises absorbing a single component of said gas, constricting the flow by a first orifice before absorbing to determine the quantity of flow, constricting the flow by a second orifice after absorption, and electrically measuring the temperature difference between a point before absorption and after the first constriction, and a point immediately after the second constriction.

2. The method of analyzing a gas flow through a single line which comprises absorbing a single component of said gas, constricting the flow by a first orifice before absorbing to determine the quantity of flow, constricting the flow by a second orifice after absorption, electrically measuring the temperature between a point before absorption and after the first constriction and a point immediately after the second constriction, repeating the process a plurality of times to determine the quantity of a plurality of constituents, and serially connecting indicating means associated with each of said temperature difference measuring means to form a complete indication of all component portions of said gas flow.

GEORGE MALMGREN.